US012466695B2

(12) United States Patent
Ko

(10) Patent No.: US 12,466,695 B2
(45) Date of Patent: Nov. 11, 2025

(54) SENSOR DEVICE, AUTOMATED TRANSPORTATION SYSTEM AND OPERATING METHOD FOR THE SAME

(71) Applicant: PIXART IMAGING INC., Hsin-Chu (TW)

(72) Inventor: Yi-Hsien Ko, Hsin-Chu (TW)

(73) Assignee: PIXART IMAGING INC., Hsin-Chu (TW)

( * ) Notice: Subject to any disclaimer, the term of this patent is extended or adjusted under 35 U.S.C. 154(b) by 1723 days.

(21) Appl. No.: 16/724,418

(22) Filed: Dec. 23, 2019

(65) Prior Publication Data

US 2021/0053795 A1 Feb. 25, 2021

Related U.S. Application Data

(60) Provisional application No. 62/890,488, filed on Aug. 22, 2019.

(51) Int. Cl.
*B66B 5/00* (2006.01)
*B66B 1/24* (2006.01)
(Continued)

(52) U.S. Cl.
CPC .......... *B66B 5/0012* (2013.01); *B66B 1/2416* (2013.01); *B66B 3/002* (2013.01); *G01J 5/027* (2013.01); *G01J 2005/0077* (2013.01)

(58) Field of Classification Search
CPC ..... B66B 5/0012; B66B 1/2416; B66B 3/002; B66B 1/3476; B66B 1/3423;
(Continued)

(56) References Cited

U.S. PATENT DOCUMENTS 5,555,512 A * 9/1996 Imai .................... G08B 13/194 250/342
8,334,906 B2 * 12/2012 Lipton ............ G08B 13/19613 348/169
(Continued)

FOREIGN PATENT DOCUMENTS

CN 1759613 A 4/2006
CN 105571728 A 5/2016
(Continued)

*Primary Examiner* — Jeffrey Donels
(74) *Attorney, Agent, or Firm* — Li & Cai Intellectual Property (USA) Office

(57) ABSTRACT

A sensor device, an automated transportation system and an operating method for the same are provided. The sensor device essentially includes a thermal sensor array for capturing a two-dimensional thermographic image within a sensing zone and a processing circuit for processing the image so as to obtain a thermal distribution within the sensing zone. The sensing zone is such as a cage of the automated transportation system. The thermal distribution depicts a distribution of one or more thermal sources for determining a status of the sensing zone. For example, the status is capable of indicating a number of people within the sensing zone and a personal status. Therefore, the automated transportation system is driven to operate the cage in response to a control signal that is generated according to a scenario responsive to the status.

13 Claims, 9 Drawing Sheets

(51) Int. Cl.
*B66B 3/00* (2006.01)
*G01J 5/00* (2022.01)
*G01J 5/02* (2022.01)

(58) Field of Classification Search
CPC . B66B 5/0031; G01J 5/027; G01J 2005/0077; G01J 5/0025
See application file for complete search history.

(56) References Cited

U.S. PATENT DOCUMENTS

| | | | | |
|---|---|---|---|---|
| 10,239,728 | B2 * | 3/2019 | Finn | B66B 1/3476 |
| 2006/0037818 | A1 * | 2/2006 | Deplazes | G08B 13/19647 187/316 |
| 2016/0297642 | A1 * | 10/2016 | Finn | B66B 1/3476 |
| 2018/0170710 | A1 * | 6/2018 | Martin | B66B 1/3476 |
| 2019/0139254 | A1 * | 5/2019 | Mochizuki | G06F 3/147 |

FOREIGN PATENT DOCUMENTS

| | | | | | |
|---|---|---|---|---|---|
| CN | 105705448 | A | | 6/2016 | |
| CN | 206638347 | U | | 11/2017 | |
| CN | 107444998 | A | | 12/2017 | |
| CN | 107902513 | A | | 4/2018 | |
| CN | 110002291 | A | | 7/2019 | |
| CN | 110027960 | A | | 7/2019 | |
| EP | 0716402 | A1 | * | 12/1996 | G08B 13/193 |
| EP | 3075692 | A1 | * | 10/2016 | B66B 1/2408 |
| EP | 3075694 | A1 | * | 10/2016 | B66B 1/2408 |
| EP | 3599198 | A1 | * | 1/2020 | B66B 1/18 |
| WO | WO-2019043061 | A1 | * | 3/2019 | B66B 1/2458 |
| WO | WO-2019060110 | A1 | * | 3/2019 | B66B 1/2458 |

* cited by examiner

SENSOR DEVICE, AUTOMATED TRANSPORTATION SYSTEM AND OPERATING METHOD FOR THE SAME

CROSS-REFERENCE TO RELATED PATENT APPLICATION

This application claims priority from the U.S. Provisional Patent Application Ser. No. 62/890,488 filed Aug. 22, 2019, which application is incorporated herein by reference in its entirety.

FIELD OF THE DISCLOSURE

The present disclosure is generally related to a technology adapted to control an automated transportation system, and more particularly to the automated transportation system that employs a sensor device to identify status in the system and is driven to operate in response to a control signal responsive to the status.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

BACKGROUND OF THE DISCLOSURE

A general function of a transportation system is to carry goods or people to a designated location. Generally, a control circuit thereof is configured to drive the system to operate based on rules that can be applied to a place where the system is operated. For example, the control circuit can rely on one of the rules to control the transportation system to open a door of the system for a while when arriving at the designated place. Further, according to another rule, the control circuit can determine an order for driving the system to arrive at different stops when receiving different calls from the different stops at the same time. Still further, the system can ignore calls when the items to be carried in the system exceed a weight limit. For properly operating the transportation system, the control circuit is required to work smarter when facing various situations.

With an elevator system including one or more cages as an example, the elevator system can operate properly when useful information can be acquired efficiently, including inside or outside the cages. For example, a weight sensor can be disposed inside each of the cages for the system to acknowledge the status of passengers in every cage, and the control circuit can determine whether or not it can carry more passengers. Further, a camera can be used outside the cages at floors of a building for the system to acknowledge the number of people waiting outside the elevator doors, and the control circuit can prioritize sending one of the cages to a floor that is full of waiting people.

SUMMARY OF THE DISCLOSURE

The present disclosure provides a sensor device, an automated transportation system that adopts the sensor device, and an operating method for the automated transportation system.

In an aspect, the sensor device essentially includes a thermal sensor array that is used to capture a two-dimensional thermographic image within a sensing zone. The sensor device also includes a processing circuit that is used to process the two-dimensional thermographic image captured by the thermal sensor array. A thermal distribution within the sensing zone is obtained and can be used to determine a status of the sensing zone according to the thermal distribution.

In an embodiment of the disclosure, the thermal sensor array essentially consists of a plurality of infrared sensors arranged in an array form. The thermal sensor array can also be used to detect a temperature within the sensing zone.

In one aspect, the thermal distribution is an image that is used to depict a distribution of one or more thermal sources that can be regarded as people. The status of the sensing zone is capable of indicating a number of people within the sensing zone and at least one personal status analyzed from the one or more thermal sources.

In yet another aspect, the sensor device further includes a database that records a plurality of shape samples used to screen the distribution of one or more thermal sources for determining the number of people and the at least one personal status.

Further, the sensor device includes an interface used to connect with an automated transportation system, and the automated transportation system receives a status data rendered by the status of the sensing zone via this interface.

For example, the automated transportation system is such as an elevator system. The sensing zone can be one or more cages of the elevator system, and the thermal sensor array is disposed inside these cages.

In an aspect, the automated transportation system also includes a data processor that receives the status data from the sensor device and generates a control signal according to a scenario responsive to the status. The automated transportation system includes a control circuit that receives the control signal and can be used to operate the cage via the corresponding transportation drive circuit.

In the operating method for the automated transportation system, by the thermal sensor array of a sensor device, a two-dimensional thermographic image within a sensing zone of the automated transportation system is captured. The two-dimensional thermographic image is then analyzed for obtaining a thermal distribution within the sensing zone. The thermal distribution can be used to determine a status of the sensing zone.

In the method, the personal status is determined by identifying a person's posture or a series of changes of the person's postures within a period of time. According to the control signal, the cage of the automated transportation system is driven to be stopped, go to a specific location, restrict one or more functions, wait for a period of time, make an emergency call, adjust an air conditioner in the cage, make a notification, or collaborate with other one or more cages.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

DETAILED DESCRIPTION OF THE EXEMPLARY EMBODIMENTS

Figure 1:
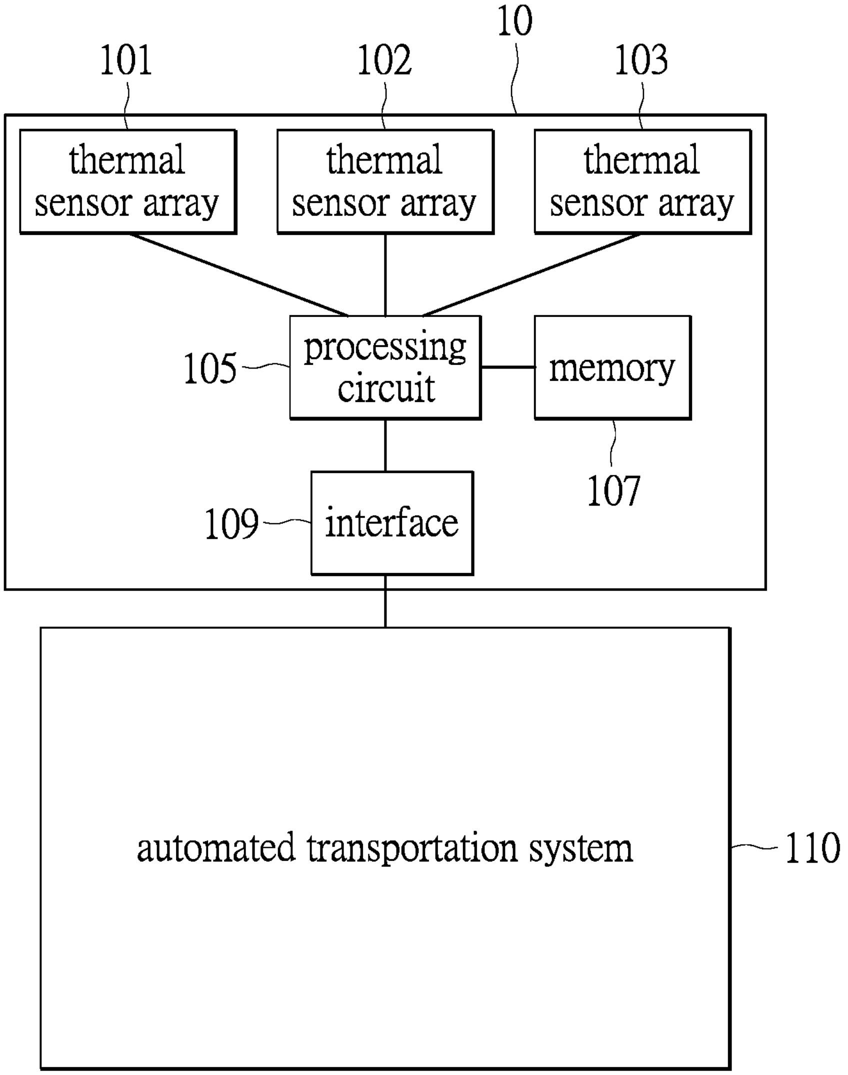
FIG. 1 is a schematic diagram depicting a sensor device used for an automated transportation system in one embodiment of the disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

The disclosure is generally related to a sensor device and an automated transportation system using the sensor device. The sensor device, in one embodiment, uses at least one thermal sensor array to obtain a thermal distribution of an area in order to determine a status of the area and the automated transportation system can operate accordingly. The thermal sensor is such as an infrared sensor. Further, the infrared sensor can sense the temperature around the area and therefore allow the system to obtain more environmental information for additional use.

FIG. 1 is a schematic diagram depicting a sensor device used for the automated transportation system in one embodiment of the disclosure.

A sensor device 10 shown in FIG. 1 essentially includes one or more thermal sensor arrays 101, 102 and 103, and a processing circuit 105 that is electrically connected to the thermal sensor arrays 101, 102 and 103. The processing circuit 105 is used to process the data generated by each of the thermal sensor arrays 101, 102 and 103, and the data can be temporarily stored in a memory 107 of the sensor device 10. In particular, the sensor device 10 can be used for an automated transportation system 110. The sensor device 10 further includes an interface 109 that is electrically connected with the processing circuit 105 and is used to connect with the automated transportation system 110.

Specifically, when the sensor device 10 is in operation, at least one of the thermal sensor arrays (101, 102 or 103) is used to capture a two-dimensional thermographic image within a sensing zone of the automated transportation system 110 or a sensing zone near the automated transportation system 110. The processing circuit 105 is used to process the two-dimensional thermographic image so as to obtain a thermal distribution within the sensing zone. The thermal distribution can be used to determine a status of the sensing zone by the shape of the thermal distribution.

Figure 2:
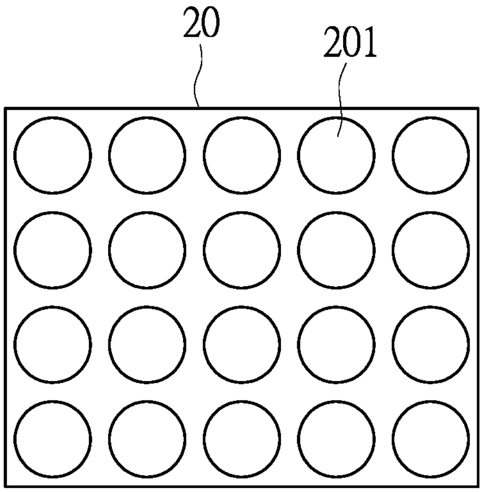
FIG. 2 is a schematic diagram depicting a thermal sensor array in one embodiment of the present disclosure.

The thermal sensor array (101, 102 or 103) essentially consists of a plurality of thermal sensor elements arranged in an array form. Reference is made to FIG. 2, which schematically shows a thermal sensor array in one embodiment of the present disclosure.

In the schematic diagram of FIG. 2, a plurality of thermal sensor elements (201) form a thermal sensor array 20. Each of the thermal sensor elements 201 can individually obtain thermal information of a certain area. Every thermal sensor element 201 can be implemented by one or more infrared sensor cells. The infrared sensor cell is an electronic component which is able to sense the light with infrared light wavelength of the environment within a certain angle of view. Therefore, the thermal sensor array 20 can sense a certain range of the infrared radiation to measure the heat of an object within the angle of view. Each of the thermal sensor element 201 could also be such as a PIR sensor (passive IR sensor) that can conduct motion detection. It should be noted that each of the thermal sensor elements 201 covers a certain angle of view that forms a sensing pixel and all the arrayed thermal sensor elements 201 can have a wide coverage for forming a sensing zone.

Figure 3:
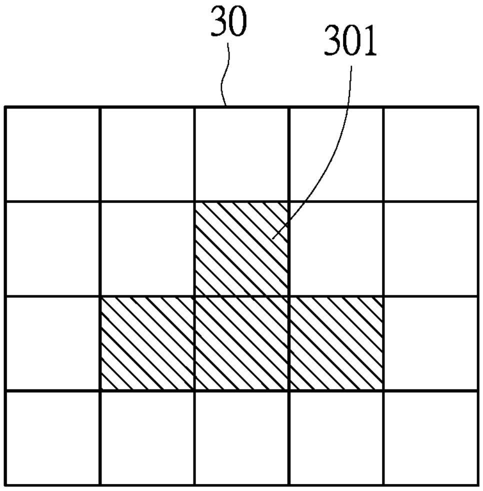
FIG. 3 schematically shows a thermal distribution map for indicating the regions to be sensed in one embodiment of the disclosure.

The thermal sensor array is used to capture the two-dimensional thermographic image that can be referred to a thermal distribution map 30 shown in FIG. 3. The pixels of the thermal distribution map 30 shown in the diagram can be mapped onto the thermal sensor elements 201 of the thermal sensor array 20, wherein each of the thermal sensor elements 201 generates a value representing a thermal condition (e.g. temperature) of a sensing area. In this embodiment, each of the thermal sensor elements 201 covers different sensing area.

The thermal distribution map 30 is used for indicating a region to be sensed, e.g., a sensed region 301, which may indicate one or more thermal sources (e.g. living creatures) within a sensing zone. The sensed region 301 shown in the diagram is schematically indicative of a combination of several sensing pixels with respect to several thermal sensor elements (201, FIG. 2). For example, the sensed region 301 may be regarded as a passenger inside a cage when the sensing pixels of the sensed region 301 have higher pixel values than a threshold preset by the system. In one aspect of the disclosure, the sensed region 301 can be regarded as the passenger when the number of the combined sensing pixels with the pixel values higher than the threshold (first threshold) is also higher than another threshold (second threshold). It should be noted that the second threshold is configured to eliminate the disqualified region due to it may be noises.

Furthermore, if the thermal sensor array 20 continuously produces the two-dimensional thermographic images for a period time, a series of corresponding thermal distribution maps (30) can also be produced and can be used to determine if any motion is found within the sensing zone. Still further, a living object is regarded as a thermal source that can be detected by the sensor device since the infrared sensor can be used to sense temperature.

Figure 4:
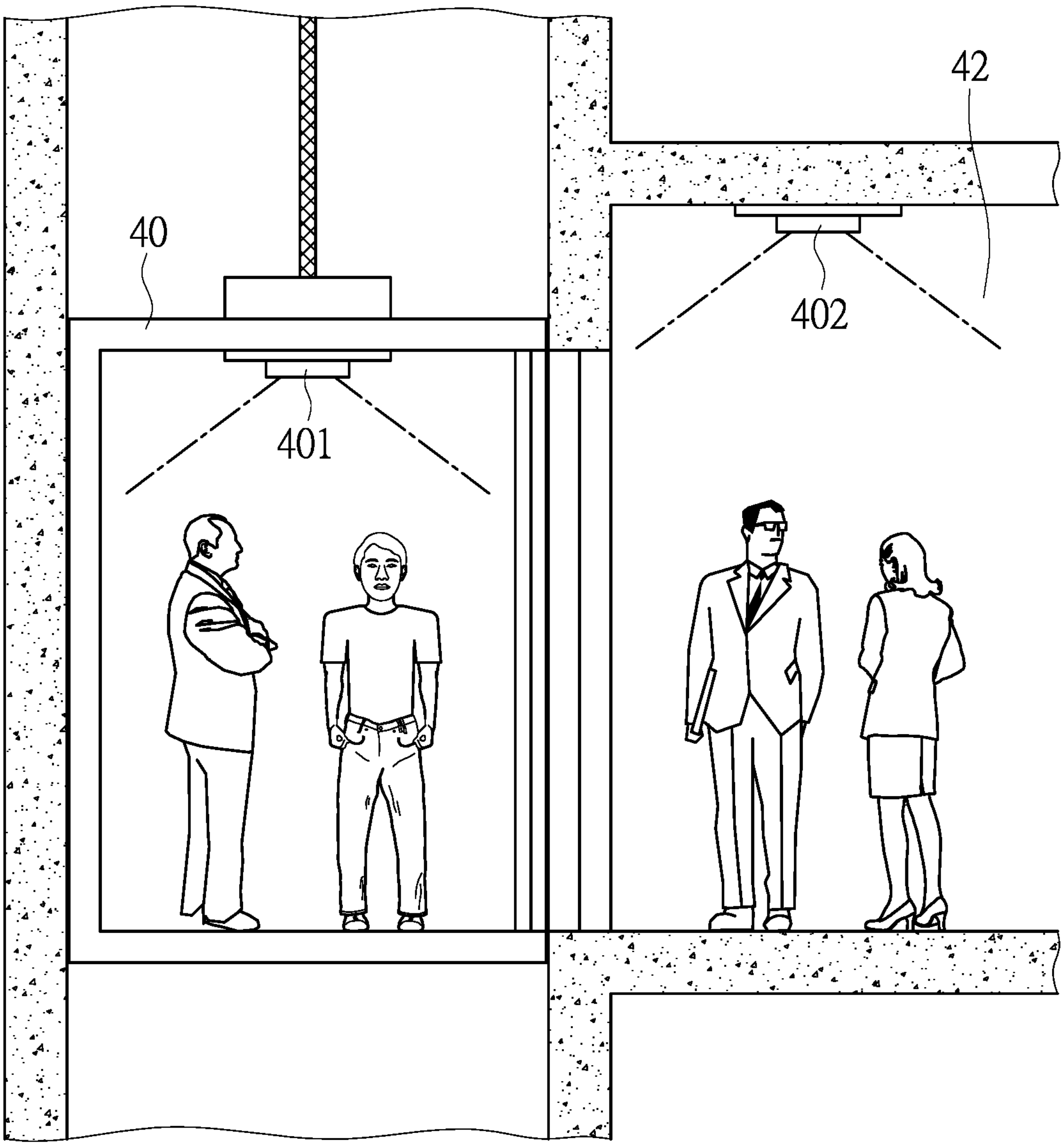
FIG. 4 is a schematic diagram depicting one or more thermal sensor arrays being disposed according to one embodiment of the disclosure.

According to one of the embodiments of the disclosure, the automated transportation system can be an elevator system including one or more cages. Reference is made to FIG. 4, which is a schematic diagram depicting a first thermal sensor array 401 being disposed on a roof of an elevator cage 40, and a second thermal sensor array 402 being disposed outside of the elevator cage 40, e.g., a corridor 42. For example, in one embodiment of the sensor device, one of the thermal sensor arrays can be disposed at the corridor 42 near a door of the elevator cage 40 for capturing another two-dimensional thermographic image of the corridor 42 from top to bottom. Thus, the elevator system can also acquire the status outside the elevator cage 40, and the said status can be referred to in operation of the elevator cage 40 by the automated transportation system.

Through the arrayed thermal sensor elements, every thermal sensor array can sense one or more thermal source within a sensing zone that is formed with a spatial coverage based on an angle of view of the thermal sensor array. In the figure, the first thermal sensor array 401 inside the elevator cage 40 is used to sense one or more thermal sources formed by several persons within a sensing zone that can be configured to cover all objects within the elevator cage 40. Further, another sensor array such as the second thermal sensor array 402 can be used to obtain the status outside the elevator cage 40. The second thermal sensor array 403 senses the thermal sources outside the elevator cage 40, e.g., the corridor 42, within another sensing zone. Both the first thermal sensor array 401 and the second thermal sensor array 402 capture the images with respect to the two sensing zones (elevator cage 40 and corridor 42), and both of which render two respective thermal distributions independently. It should be noted that the thermal distribution is a thermo-responsive image which is generated by the sensor device and is used to depict a distribution of one or more thermal sources within a sensing zone. According to the present example, the thermal sources are such as those of the passengers shown in the diagram inside and outside the elevator cage 40.

For example, when the sensor device identifies the status such as a number of passengers at the corridor 42 according to the thermal distribution thereof, the elevator system controls a waiting time of the elevator cage 40 in order to allow the passengers to select the floors to be reached by pushing the buttons. The elevator system may shorten the waiting time or close the door of the elevator cage 40 immediately when the sensor device finds no one waiting outside the cage 40 even if the elevator cage 40 is summoned by anyone at the corridor 42. Furthermore, the elevator system can also drive one or more available elevator cages 40 to pick up the passengers if the recognized number of the passengers waiting for the cages and/or staying inside the cage is matched with a specific scenario e.g., more than a threshold. Furthermore, the status of the passengers inside the elevator cage 40 may also trigger an emergency call if any emergent status is identified by the sensor device.

Accordingly, the automated transportation system (e.g., the elevator system) can identify the people (e.g., the passengers) and/or recognize the people's behavior within the sensing zones by processing the thermal distribution rendered by the thermal sensor array(s) via an image-processing method. In the present example, the sensor device allows the elevator system to determine a status of the one or more sensing zones with respect to one or more elevator cages and/or corridors outside the cages. The status of the sensing zone can indicate a number of people within the sensing zone and at least one personal status analyzed from the one or more thermal sources.

Therefore, the automated transportation system is able to have a comprehensive control over the whole system when the system is able to efficiently acquire statuses of all the sensing zones from the sensor device. For example, the elevator system can efficiently coordinate operations of all the elevator cages so as to cope with the heavy transportation of passengers when it refers to the information rendered by the sensor device, especially the status in each of the cages.

Figure 5:
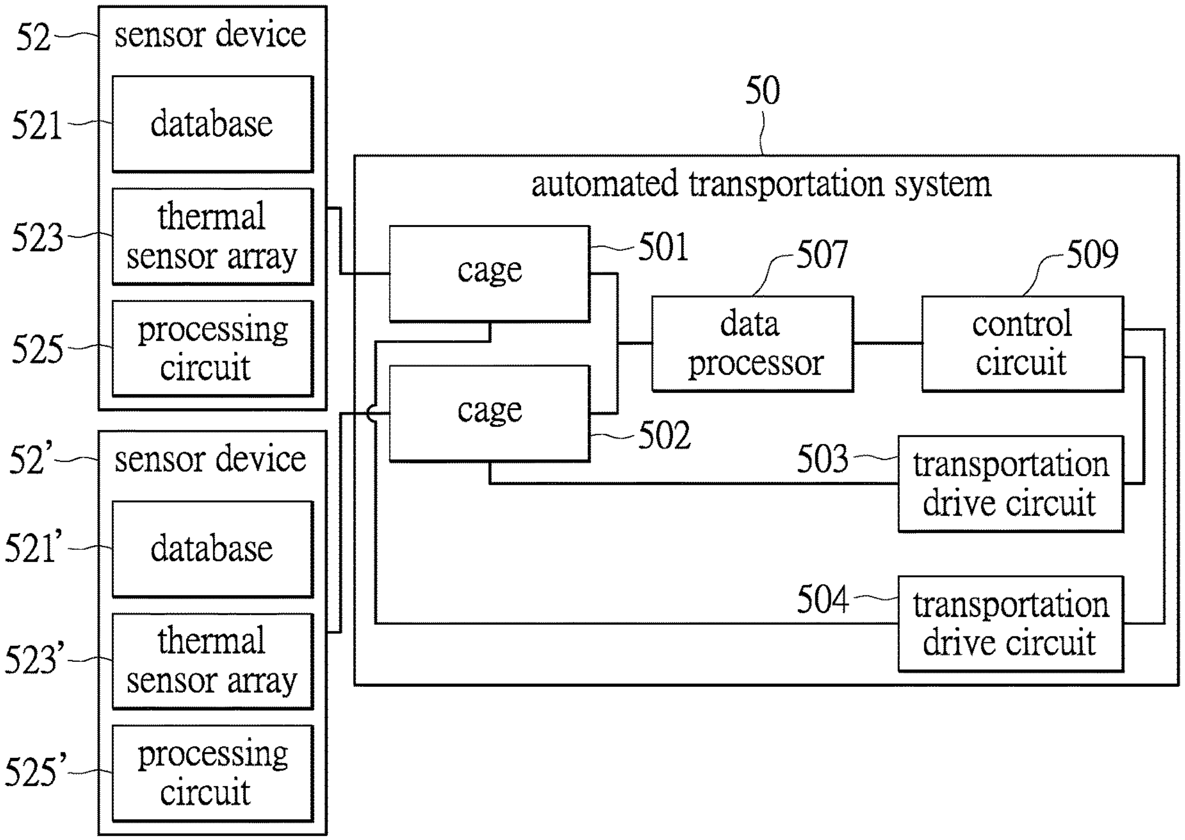
FIG. 5 shows a block diagram depicting a system integrating the sensor device and the automated transportation system according to one embodiment of the disclosure.

FIG. 5 shows a block diagram depicting an automated transportation system integrating the sensor device according to one embodiment of the disclosure.

In an aspect of the disclosure, the automated transportation system 50 can be operated when incorporating the sensor devices 52, 52'. In the sensor device 52 (similar to the sensor device 52'), one or more thermal sensor arrays 523 (or 523') are included for capturing one or more two-dimensional thermographic images with respect to one or more sensing zones rendered by the automated transportation system 50. A processing circuit 525 (or 525') is also included in the sensor device 52 (or 52') for receiving the images generated by the thermal sensor arrays 523 (or 523') and then processing the two-dimensional thermographic images captured by every thermal sensor array so as to obtain one or more thermal distributions. The thermal distribution is used to depict distribution of one or more thermal sources within the sensing zone in real-time. The sensor device 52 (or 52') includes a database 521 (or 521') that records a plurality of shape samples for recognizing the objects within the sensing zone(s).

According to one of the embodiments, the afore-mentioned thermal sensor array 523 of the sensor device 52 essentially includes a plurality of infrared sensors arranged in an array form. The infrared sensors are used to sense the one or more thermal sources within the sensing zone so as to render the two-dimensional thermographic image. The two-dimensional thermographic image reveals a temperature distribution of the one or more thermal sources. By analyzing the temperature distribution containing the one or more thermal sources within a sensing zone, the shape samples recorded in the database 521 can be used to screen the distribution of one or more thermal sources for determining the status within the sensing zone. When comparing the shape samples with the thermal sources with a specific threshold, any invalid information can be excluded, and the status within the sensing zone can be clarified. For example, the image-processing method can firstly establish a background reference such as the floor of the cage and then use a threshold to exclude the noises for the benefit of performing comparison between one or more recognized thermo-responsive images within the sensing zone and the shape samples. Furthermore, in one of the embodiments, the status of each of the sensing zones is capable of indicating the number of people or any object, and the at least one personal status or a state of the object. It should be noted that the thermo-responsive image indicates the images of the objects to be recognized from a thermal distribution of the one or more thermal sources, and the thermo-responsive image can be used to determine the statuses of the objects.

In the present example, the automated transportation system 50 includes one or more cages 501 and 502. The sensor devices 52, 52' respectively deploy the thermal sensor arrays 523, 523' to be installed in the cages 501 and 502. The cages 501 and 502 are driven by one integrated or two respective transportation drive circuits 503 and 504. The automated transportation system 50 includes a data processor 507 that is electrically connected with the sensor devices 52, 52' via an interface. The interface (not shown) can be electrically connected with the processing circuits 525, 525' respective to the sensor devices 52, 52' and the automated transportation system 50. The data processor 507 of the automated transportation system 50 receives a status data rendered by a status of every sensing zone from the sensor devices 52, 52' via the interface. The data processor 507 then generates a control signal according to a scenario responsive to the status, or based on data collected from all the sensing zones and/or any information outside the system.

Further, the automated transportation system 50 further includes a control circuit 509 and one or more transportation drive circuits (503 and 504). The control circuit 509 is electrically connected with the data processor 507 and the one or more transportation drive circuits (503 and 504) with respect to the cages (501 and 502). The control circuit 509 relies on the control signal generated by the control circuit 509 to control the operations of the cages (501 and 502) via the corresponding transportation drive circuits (503 and 504).

Figure 6:
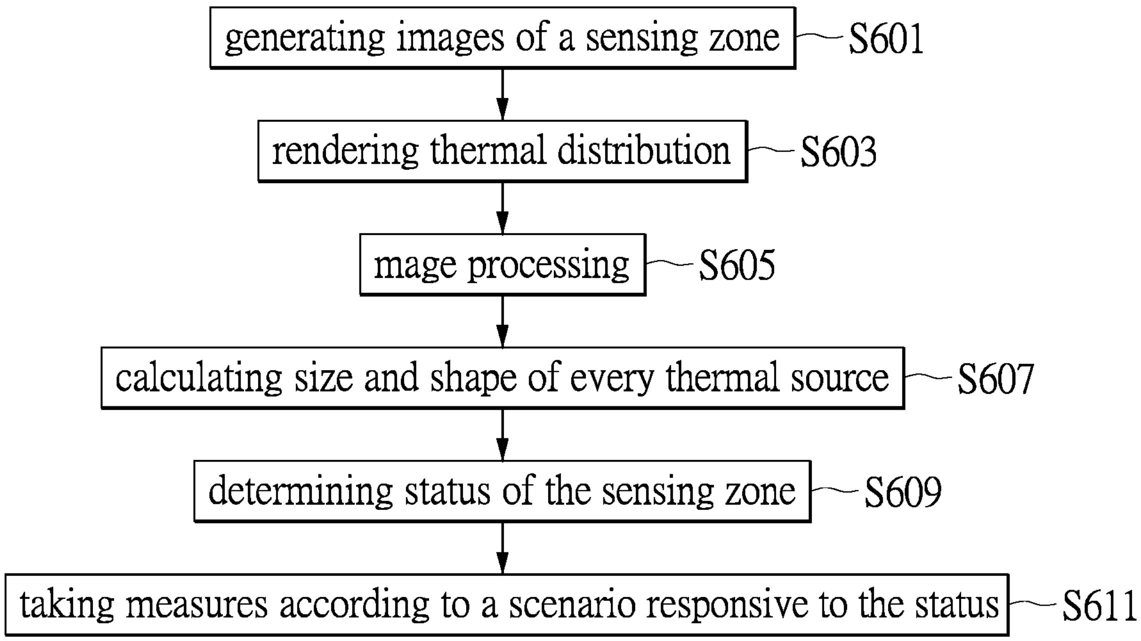
FIG. 6 shows a flow chart describing a method for operating the automated transportation system through the sensor device in one embodiment of the disclosure.

Reference is next made to FIG. 6, which shows a flow chart describing a method for operating an automated transportation system through a sensor device in one embodiment of the disclosure.

In the beginning of process, such as in step S601, a series of images of a sensing zone are generated by a thermal sensor array of the sensor device. The image captured by the thermal sensor array is referred to as a two-dimensional thermographic image within the sensing zone formed in a cage of the automated transportation system.

By a processing circuit of the sensor device, such as in step S603, the two-dimensional thermographic image is processed to render a thermal distribution within the sensing zone. In step S605, the thermal distribution is used to determine a status of the sensing zone by an image-processing method.

It should be noted that, in the sensor device, the thermal distribution is an image that depicts a distribution of one or more thermal sources. Furthermore, in one embodiment of the disclosure, the image-processing method incorporates a plurality of shape samples recorded in a database to be compared with the thermal sources so as to screen the thermal sources for determining their number, size, and/or shape.

By the image-processing method, such as in step S607, every thermal source can be recognized when its size, shape and/or an area ratio occupied by the thermal source can be calculated. In step S609, a status of the sensing zone can be determined. Taking the elevator system as an example, by analyzing the one or more thermal sources, the status of sensing zone indicates the status of an elevator cage (or the corridor) such as number of people within the cage or at the corridor and at least one personal status. Lastly, such as in step S611, the elevator system can take measures according to a scenario responsive to the status.

Figure 7:
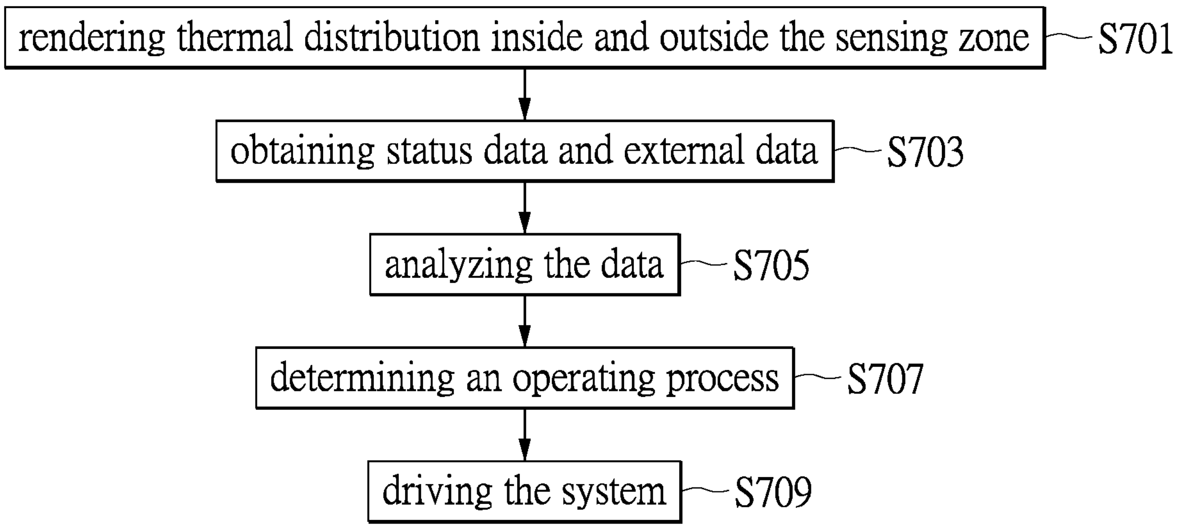
FIG. 7 shows another flow chart describing a process for operating the automated transportation system in another embodiment of the disclosure.

Another embodiment of the operating method can be referred to FIG. 7. When capturing the two-dimensional thermographic images, such as in step S701, one or more thermal distributions inside and outside the sensing zone of the automated transportation system can be obtained by analyzing the thermographic images. In the sensor device, every thermal distribution depicts a distribution of one or more thermal sources, and the status data indicative of the status of every sensing zone can be obtained by analyzing the one or more thermal sources, such as in step S703. Further, the system can also incorporate external data such as the environmental data outside the system.

In step S705, the data can be analyzed to make a comprehensive judgment for determining an operating process, such as in step S707. After that, when the elevator system receives a status data rendered by the status of the sensing zone, a control signal is generated according to a scenario responsive to the status so as to drive the system. In step S709, a control circuit of the elevator system drives the elevator cage of the system in response to the control signal via a corresponding transportation drive circuit.

Several examples applying the sensor device, the automated transportation system, and the operating method of the present disclosure are described as follows.

Figure 8:
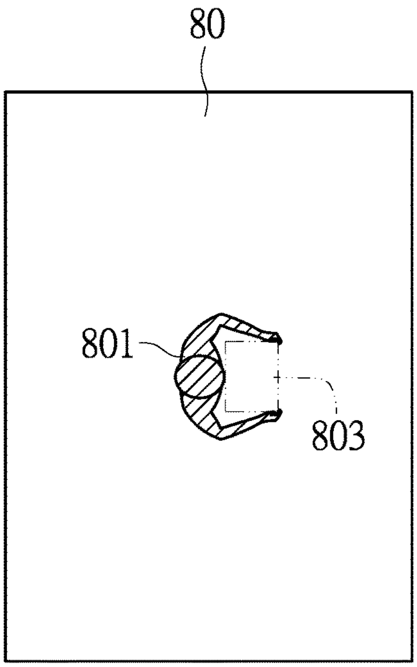
FIG. 8 and FIG. 9 are two schematic diagrams depicting a situation where a person carrying an article within a sensing zone is recognized through the system in one embodiment of the disclosure.
Figure 9:
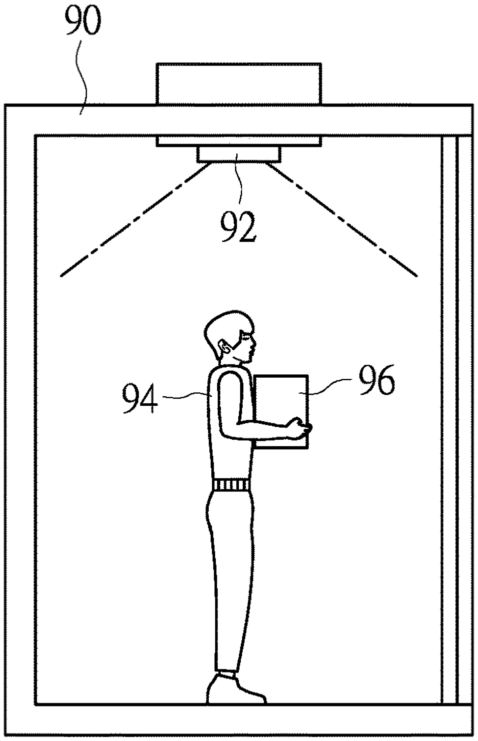

FIG. 8 and FIG. 9 are two schematic diagrams depicting a situation where a person carrying an article within a sensing zone is recognized through the system in one embodiment of the disclosure.

In FIG. 8, the diagram depicts a thermo-responsive image 801 within a two-dimensional thermographic image being captured from top to bottom by a thermal sensor array within a sensing zone 80. The two-dimensional thermographic image shows a top view inside an elevator cage and wherein an object 803 is recognized by image-analyzing the thermo-responsive image 801 shown in the diagram from a thermal distribution. The thermal distribution can be referred to for determining a status within the sensing zone 80. The figure shows that the status within the sensing zone 80 is capable of indicating a person carrying an article with arms open. For example, the posture of the person can be recognized because the body of the person is supposed to form a body thermal zone and two extending thermal zones (i.e. corresponding to the two open arms) and the body thermal zone is bigger than the other extending thermal zones.

In the present example, the two-dimensional thermographic image is used to determine an actual situation schematically shown in FIG. 9. In FIG. 9, an elevator cage 90 disposed with a thermal sensor array 92 is shown. A person 94 is shown to be inside the elevator cage 90. The personal status can be determined in FIG. 8 by identifying the person's posture or in view of a series of changes of the person's postures within a period of time. The personal status is such as the person 94 carrying a box 96 with open arms within the elevator cage 90.

When the system recognizes that the person 94 is carrying a big box 96, in an exemplary example, the automated transportation system, i.e. the elevator system, is driven to delay a waiting time during which the person 94 is allowed to push the button of the elevator in order to select a destination floor. Furthermore, when the person 94 carrying the big box 96 leaves the elevator cage 90, an opening interval of the door of the cage 90 can be extended and meanwhile the priority from other's calling will be lowered. In one aspect of the disclosure, the elevator system may also send another elevator cage to reach the other floor if the current elevator cage 90 is in service.

More specifically, the thermal distribution rendered by the sensor device may show different depths of the thermal sources within the sensing zone 80 from the thermo-responsive image 801 since the thermal sensor array can sense different temperatures from the various thermal sources even with the same temperature at different distances. Therefore, the information of depths of the thermal sources within the sensing zone 80 can also be used to recognize the status of the passenger, for example, the person carrying a heavy object with his two hands at different heights of the cage according to the present example. According to the information of depths, a passenger can be recognized as an adult or a child by his/her height.

Figure 10:
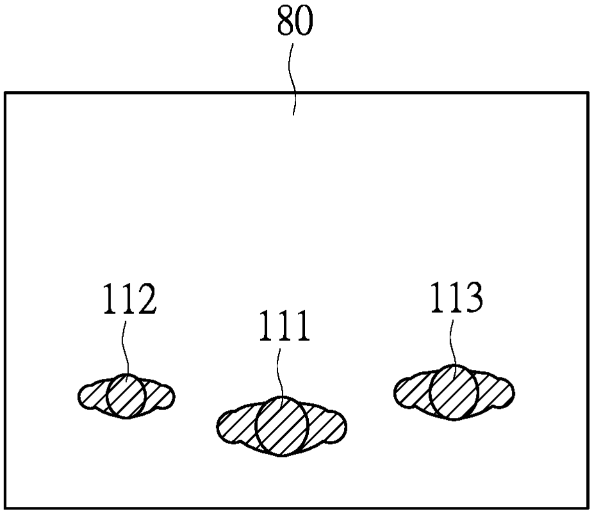
FIG. 10 and FIG. 11 are two schematic diagrams depicting another situation where several persons within a sensing zone are recognized through the system in one embodiment of the disclosure.
Figure 11:
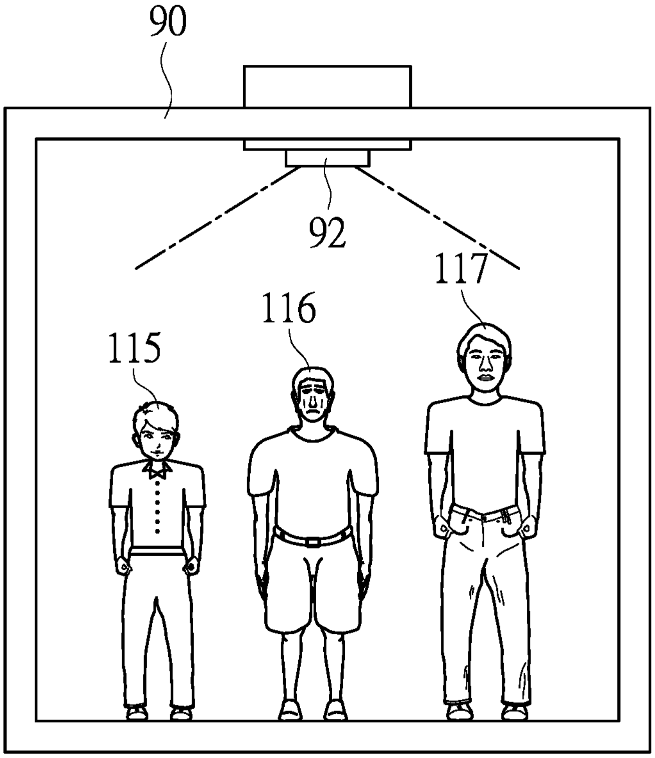

FIG. 10 and FIG. 11 are two schematic diagrams depicting another situation where several persons within a sensing zone are recognized through the system in one embodiment of the disclosure.

FIG. 10 shows a two-dimensional thermographic image within a sensing zone 80. By analyzing the thermal distribution rendered by the two-dimensional thermographic image, the thermal distribution shows several separate thermo-responsive images 111, 112 and 113. In an exemplary example, by comparing with the shape samples recorded in the database of the sensor device, the thermo-responsive images 111, 112 and 113 can be recognized as three people, as shown in FIG. 11.

In FIG. 11, an actual situation corresponding to the two-dimensional thermographic image captured by the sensor device within the sensing zone is shown. The figure shows a cage 90 with three persons 115, 116 and 117 inside. Therefore, the thermal distribution rendered from the two-dimensional thermographic image can be used to determine the number of people within the sensing zone. For example, the number of people can also be the status referred to for the automated transportation system to drive the cage to operate according to a scenario responsive to the status.

Figure 12:
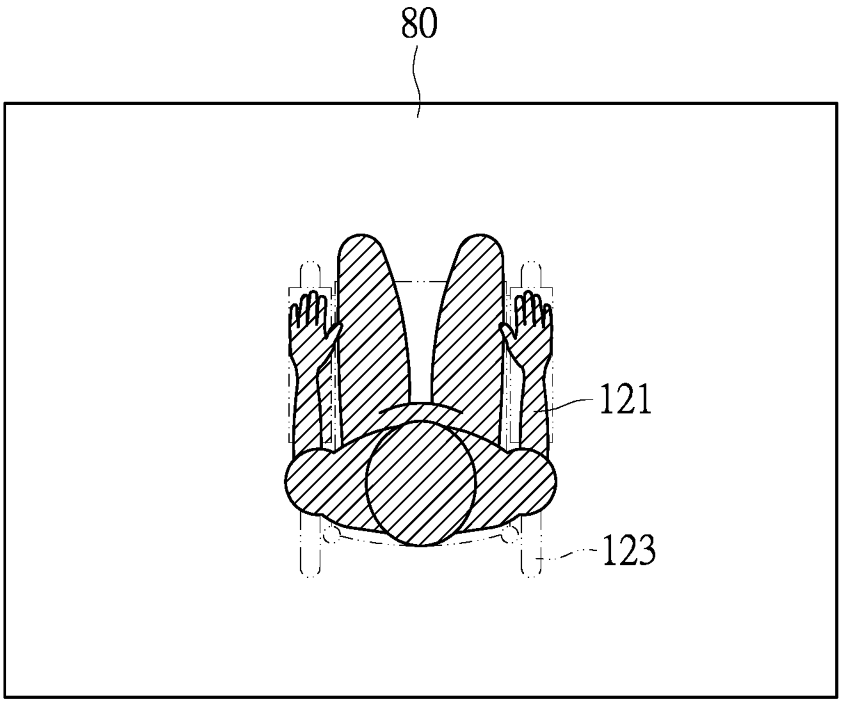
FIG. 12 and FIG. 13 are two schematic diagrams depicting one more situation where a person in a wheelchair within a sensing zone is recognized through the system in one embodiment of the disclosure.
Figure 13:
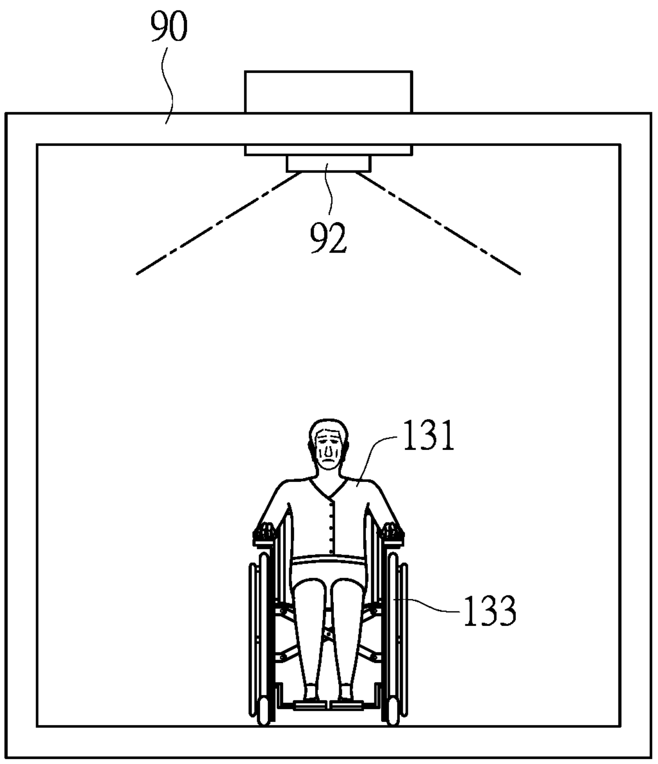

FIG. 12 and FIG. 13 also use two schematic diagrams to depict a situation where a person sitting in a wheelchair within a sensing zone is recognized through the system in one embodiment of the disclosure.

FIG. 12 schematically shows another two-dimensional thermographic image within the sensing zone 80, and a thermo-responsive image 121 is recognized from a thermal distribution. In details, the thermo-responsive image 121 shows an object 123 having four extended thermal zones that can be recognized as a person sitting in the wheelchair with two hands and two thighs when comparing the shape samples recorded in the database of the sensor device.

More specifically, referring to FIG. 13, the thermo-responsive 121 relying on the thermal distribution shows a person with open arms and with two thighs extended forward, and it is recognized as a person 131 sitting in a wheelchair 133 inside the cage 90 in an actual situation.

When the automated transportation system identifies that a person sitting in a wheelchair enters the elevator cage, according to a control signal responsive to the status, the cage is driven to delay the waiting time, for example 20%-50% longer than normal, for the person to select a destination floor. In one aspect of the disclosure, when the person sitting in the wheelchair leaves the elevator cage, the opening time of the cage can be extended for a while and meanwhile the priorities with respect to the elevator cages and the others of the system are also adjusted accordingly. Further, the opening time of the cage can also be temporarily extended when the sensor device of the corridor senses the person sitting in the wheelchair or anyone who carries a big thing waiting to enter the elevator cage. It should be noted that many situations can be expected by the automated transportation system, and also corresponding measures will be taken according to a scenario responsive to a status, such as driving the cage to be stopped, go to a specific location, restrict one or more functions, wait for a period of time, make an emergency call, adjust an air conditioner in the cage, make a notification, or collaborate with other one or more cages.

For example, the elevator cage is driven to be stopped at a specific floor and make an emergency call if the sensor device relying on a thermal distribution determines that an emergency event such as a person falling in the elevator cage. Further, the elevator system may drive the air conditioner to send more cold air into the elevator cage if the sensor device senses that the number of passengers inside the cage is more than a threshold, and, in the meantime, any calling initiated by the external button of the elevator may be ignored for allowing the passengers inside the elevator cage having priority to select the floor to be reached. Otherwise, the air conditioner may be driven to a power-saving mode if the cage is empty or only few people are inside. Accordingly, in one of the objectives of the system and method described in the disclosure, the information provided from the sensor device allows the automated transportation system to avoid meaningless operations, such as from mischief, or waste of electricity, and also to operate more efficiently.

In conclusion, according to the above embodiments concerning the sensor device, the automated transportation system and the operating method for the same of the present disclosure, the automated transportation system adopts the sensor device that essentially uses a thermal sensor array for rendering a thermal distribution. By performing an image-processing method, the thermal distribution reveals a distribution of one or more thermal sources that can be used to determine a status of a sensing zone. This aspect allows the automated transportation system to be adaptive to various situations. Furthermore, the system and method of the disclosure can be adapted to many kinds of transportation systems such as the aforementioned elevator, an escalator or any mass transit system.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. An automated transportation system, wherein the automated transportation system is an elevator system, comprising:

one or more cages, which is a elevator cage, in which a thermal sensor array is disposed in each cage, and each cage is driven by a transportation drive circuit;

a data processor receiving a status data rendered by a status of a sensing zone from a sensor device and generating a control signal according to a scenario responsive to the status; and a control circuit, electrically connected with the data processor and the transportation drive circuit with respect to each cage, receiving the control signal, and used to control an operation of the cage via the corresponding transportation drive circuit;

wherein the sensor device comprises:

one or more thermal sensor arrays disposed inside the one or more cages, and every thermal sensor array is used to capture a two-dimensional thermographic image within one cage; and a processing circuit, electrically connected to the one or more thermal sensor arrays, used to process the two-dimensional thermographic image captured by every thermal sensor array so as to obtain a thermal distribution within the cage, and determine the status of the cage according to the thermal distribution;

wherein one of the thermal sensor arrays is disposed at a corridor near a door of the cage, and is used to capture another two-dimensional thermographic image of the corridor from top to bottom; in the sensor device, the thermal distribution is an image that depicts a distribution of one or more thermal sources, and the status of the cage or the corridor is capable of indicating a number of people within the cage or at the corridor, and at least one personal status analyzed from the one or more thermal sources;

wherein the sensor device further includes a database recording a plurality of shape samples that are used to screen the distribution of one or more thermal sources for determining the number of people and the at least one personal status.

2. The automated transportation system according to claim 1, wherein the thermal sensor array disposed inside the cage captures the two-dimensional thermographic image from top to bottom.

3. The automated transportation system according to claim 1, wherein the at least one personal status is capable of indicating a person carrying an article with two hands, or a person sitting in a wheelchair.

4. The automated transportation system according to claim 1, wherein the thermal sensor array of the sensor device essentially consists of a plurality of infrared sensors arranged in an array form.

5. An automated transportation system, comprising:

one or more cages, in which a thermal sensor array is disposed in each cage, and each cage is driven by a transportation drive circuit;

a data processor receiving a status data rendered by a status of a sensing zone from a sensor device and generating a control signal according to a scenario responsive to the status; and a control circuit, electrically connected with the data processor and the transportation drive circuit with respect to each cage, receiving the control signal, and used to control an operation of the cage via the corresponding transportation drive circuit;

wherein the sensor device comprises:

one or more thermal sensor arrays disposed inside the one or more cages, and every thermal sensor array is used to capture a two-dimensional thermographic image within one cage; and a processing circuit, electrically connected to the one or more thermal sensor arrays, used to process the two-dimensional thermographic image captured by every thermal sensor array so as to obtain a thermal distribution within the cage, and determine the status of the cage according to the thermal distribution;

wherein, in the sensor device, the thermal distribution is an image that depicts a distribution of one or more thermal sources, and the status within the cage is capable of indicating a number of people within the cage and at least one personal status analyzed from the one or more thermal sources;

wherein the sensor device further includes a database recording a plurality of shape samples that are used to screen the distribution of one or more thermal sources for determining the number of people and the at least one personal status.

6. The automated transportation system according to claim 5, wherein one of the thermal sensor arrays is disposed at a corridor near a door of the cage, and is used to capture another two-dimensional thermographic image of the corridor from top to bottom.

7. The automated transportation system according to claim 6, wherein, in the sensor device, the thermal distribution is an image that depicts a distribution of one or more thermal sources, and the status of the cage or the corridor is capable of indicating a number of people within the cage or at the corridor, and at least one personal status analyzed from the one or more thermal sources.

8. The automated transportation system according to claim 7, wherein the sensor device further includes a database recording a plurality of shape samples that are used to screen the distribution of one or more thermal sources for determining the number of people and the at least one personal status.

9. An operating method for an automated transportation system, comprising:

obtaining a two-dimensional thermographic image captured by a thermal sensor array within a sensing zone of the automated transportation system;

obtaining a thermal distribution within the sensing zone and determining a status of the sensing zone according to the thermal distribution;

receiving a status data rendered by the status of the sensing zone and generating a control signal according to a scenario responsive to the status; and driving a cage of the automated transportation system in response to the control signal via a corresponding transportation drive circuit;

wherein the thermal sensor array essentially consists of a plurality of infrared sensors arranged in an array form, and the thermal distribution is an image that depicts a distribution of one or more thermal sources taken by the terminal sensor array, in which the status of the sensing zone is capable of indicating a number of people within the sensing zone and at least one personal status analyzed from the one or more thermal sources;

wherein the sensor device further includes a database recording a plurality of shape samples that are used to screen the distribution of one or more thermal sources for determining the number of people and the at least one personal status.

10. The operating method according to claim 9, wherein the personal status is determined by identifying a posture or a series of posture changes of a person within a period of time.

11. The operating method according to claim 10, wherein the at least one personal status is capable of indicating a person carrying an article with two hands, or a person sitting in a wheelchair.

12. The operating method according to claim 9, wherein the status further includes a temperature detected by the thermal sensor array within the sensing zone.

13. The operating method according to claim 12, wherein, according to the control signal, the cage of the automated transportation system is driven to be stopped, go to a specific location, restrict one or more functions, wait for a period of time, make an emergency call, adjust an air conditioner in the cage, make a notification, or collaborate with other one or more cages.

* * * * *